United States Patent
van Zelm

(10) Patent No.: US 10,060,255 B2
(45) Date of Patent: *Aug. 28, 2018

(54) DOWNHOLE LOW RATE LINEAR REPEATER RELAY NETWORK TIMING SYSTEM AND METHOD

(71) Applicant: XACT Downhole Telemetry, Inc., Calgary (CA)

(72) Inventor: John-Peter van Zelm, Calgary (CA)

(73) Assignee: XACT Downhole Telemetry, Inc., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,367

(22) Filed: Oct. 4, 2016

(65) Prior Publication Data

US 2017/0022805 A1    Jan. 26, 2017

Related U.S. Application Data

(63) Continuation of application No. 14/094,417, filed on Dec. 2, 2013, now Pat. No. 9,458,711.

(Continued)

(51) Int. Cl.
*E21B 47/16* (2006.01)
*E21B 47/12* (2012.01)
(Continued)

(52) U.S. Cl.
CPC .......... *E21B 47/122* (2013.01); *E21B 17/003* (2013.01); *E21B 17/028* (2013.01);
(Continued)

(58) Field of Classification Search
None
See application file for complete search history.

(56) References Cited

U.S. PATENT DOCUMENTS

| 5,365,229 A | 11/1994 | Gardner et al. |
| 5,450,616 A | 9/1995 | Rom |

(Continued)

FOREIGN PATENT DOCUMENTS

| EP | 1978670 | 10/2008 |
| EP | 2466978 | 6/2012 |

(Continued)

OTHER PUBLICATIONS

"International Search Report and Written Opinion", PCT/US2014/030682, dated Aug. 22, 2014, pp. 1-11.

(Continued)

*Primary Examiner* — Adnan Aziz
(74) *Attorney, Agent, or Firm* — Law Office of Mark Brown, LLC; Mark E. Brown

(57) ABSTRACT

A downhole repeater network timing system for a drilling rig including a drillstring extending subsurface downwardly from a surface wellhead. The system includes a node located at the drillstring lower end and including a sensor adapted for providing a signal data set output corresponding to downhole drilling conditions. Multiple nodes are located downhole between the Bottom Hole Assembly (BHA) and the wellhead and are associated with the drillstring. The nodes are adapted for receiving and transmitting the signals. The timing control system is adapted for controlling all times within a timeframe according to pre-configured constants known to all nodes. A downhole low rate linear repeater network timing method uses the system.

6 Claims, 5 Drawing Sheets

Related U.S. Application Data

(60) Provisional application No. 61/731,898, filed on Nov. 30, 2012.

(51) Int. Cl.

| | | |
|---|---|---|
| *E21B 17/00* | (2006.01) | |
| *E21B 17/02* | (2006.01) | |
| *G01V 1/26* | (2006.01) | |
| *E21B 17/20* | (2006.01) | |
| *E21B 43/04* | (2006.01) | |
| *E21B 43/26* | (2006.01) | |

(52) U.S. Cl.
CPC .............. *E21B 17/20* (2013.01); *E21B 43/04* (2013.01); *E21B 43/26* (2013.01); *E21B 47/12* (2013.01); *E21B 47/16* (2013.01); *G01V 1/26* (2013.01)

(56) References Cited

U.S. PATENT DOCUMENTS

| | | | |
|---|---|---|---|
| 5,838,727 A | 11/1998 | Lyon et al. | |
| 6,144,316 A | 11/2000 | Skinner | |
| 6,370,082 B1 | 4/2002 | Gardner et al. | |
| 6,445,307 B1 | 9/2002 | Rassi et al. | |
| 6,714,611 B1 | 3/2004 | Du et al. | |
| 7,324,010 B2 | 1/2008 | Gardner | |
| 7,339,494 B2 | 3/2008 | Shah et al. | |
| 7,477,161 B2 | 1/2009 | MacPherson et al. | |
| 7,480,207 B2 | 10/2009 | Marsh | |
| 7,777,645 B2 | 8/2010 | Shah et al. | |
| 7,913,773 B2 | 3/2011 | Li et al. | |
| 8,040,249 B2 | 10/2011 | Shah et al. | |
| 8,102,784 B1 | 1/2012 | Lemkin et al. | |
| 8,115,651 B2 | 2/2012 | Camwell et al. | |
| 8,164,476 B2 | 4/2012 | Hache et al. | |
| 8,248,266 B2 | 8/2012 | MacPherson et al. | |
| 8,704,677 B2 | 4/2014 | Prammer | |
| 8,902,695 B2 | 12/2014 | Dashevskiy et al. | |
| 2002/0022495 A1 | 2/2002 | Choi | |
| 2002/0133733 A1 | 9/2002 | Abdel-Ghaffar | |
| 2002/0140572 A1* | 10/2002 | Gardner ................... | E21B 47/12 340/853.3 |
| 2003/0006906 A1 | 1/2003 | Gardner et al. | |
| 2004/0085988 A1 | 5/2004 | Gardner et al. | |
| 2005/0035875 A1 | 2/2005 | Hall et al. | |
| 2005/0226214 A1 | 10/2005 | Keslassy et al. | |
| 2005/0270171 A1 | 12/2005 | Quintero et al. | |
| 2006/0114746 A1 | 6/2006 | Gardner et al. | |
| 2006/0145889 A1 | 7/2006 | Rawle et al. | |
| 2006/0272859 A1* | 12/2006 | Pastusek ................ | E21B 21/08 175/40 |
| 2007/0091983 A1 | 4/2007 | Siriwongpairat | |
| 2007/0159321 A1 | 7/2007 | Ogata et al. | |
| 2007/0257809 A1 | 11/2007 | Camwell et al. | |
| 2008/0024318 A1 | 1/2008 | Hall et al. | |
| 2008/0253228 A1* | 10/2008 | Camwell ................ | E21B 47/12 367/82 |
| 2009/0146836 A1 | 6/2009 | Santosa et al. | |
| 2009/0166031 A1 | 7/2009 | Hernandez | |
| 2009/0189777 A1 | 7/2009 | Johnson et al. | |
| 2010/0039286 A1 | 2/2010 | Robbins | |
| 2010/0097890 A1 | 4/2010 | Sullivan | |
| 2010/0150162 A1 | 6/2010 | Nakayama | |
| 2010/0182161 A1 | 7/2010 | Robbins | |
| 2010/0313646 A1 | 12/2010 | Mehta et al. | |
| 2011/0141852 A1 | 7/2011 | Camwell et al. | |
| 2011/0165861 A1 | 7/2011 | Wilson et al. | |
| 2011/0205080 A1* | 8/2011 | Millot ..................... | E21B 47/16 340/854.4 |
| 2011/0247803 A1 | 10/2011 | Rodney et al. | |
| 2012/0037423 A1 | 2/2012 | Geerits et al. | |
| 2012/0126992 A1 | 5/2012 | Rodney et al. | |
| 2012/0126993 A1 | 5/2012 | Samson et al. | |
| 2012/0148237 A1 | 6/2012 | Harrison et al. | |
| 2012/0243454 A1 | 9/2012 | Hwang et al. | |
| 2012/0274477 A1 | 11/2012 | Prammer | |
| 2012/0294112 A1 | 11/2012 | Pearce et al. | |
| 2012/0297070 A1 | 11/2012 | Shi | |
| 2013/0027216 A1 | 1/2013 | Jantz et al. | |
| 2013/0038358 A1 | 2/2013 | Cook | |
| 2013/0106615 A1 | 5/2013 | Prammer | |

FOREIGN PATENT DOCUMENTS

| | | |
|---|---|---|
| EP | 2972527 | 1/2016 |
| GB | 2423893 | 6/2009 |
| WO | 2009053954 | 4/2009 |
| WO | 2013162491 | 10/2013 |

OTHER PUBLICATIONS

"International Search Report and Written Opinion", PCT/US2014/030831, dated Aug. 25, 2014, pp. 1-20.

"International Search Report and Written Opinion", PCT/US2014/021356, dated Aug. 28, 2014, pp. 1-14.

Camwell, et al., "Acoustic telemetry, with multiple nodes in drillstring, used to acheive distributed MWD", Drilling Contractor, Innovating While Drilling, Mar./Apr. 2009, pp. 30-35.

Gardner, et al., "Abstract of Acoustic Telemetry Delivers More Real-Time Downhole Data in Underbalanced Drilling Operations", Society of Petroleum Engineers, 2006 Conference Paper, IADC/SPE Drilling Conference, Feb. 2006, pp. 21-23.

Schlumberger Limited, "DRILCO Rotary Kelly", http://www.slb.com/services/drilling/tools_services/machining_inspection_tubulars_surface/tubulars_subs/kelly.aspx, 2013.

Widrow, et al., "Adaptive Noise Cancelling: Principles and Applications", Proceedings of the IEEE, vol. 63, No. 12, Dec. 1975, pp. 1692-1716.

www.wikipedia.org, "Underbalanced Drilling, Wikipedia", http://en.wikipedia.org/wiki/Underbalanced_drilling, Aug. 7, 2013.

"Extended European Search Report", European Patent Application No. 14762714.5, dated Oct. 14, 2016.

"Extended European Search Report", European Patent Application No. 14764197.1, dated Feb. 16, 2017.

"Extended European Search Report", European Patent Application No. 14884471.5.

* cited by examiner

DOWNHOLE LOW RATE LINEAR REPEATER RELAY NETWORK TIMING SYSTEM AND METHOD

CROSS-REFERENCE TO RELATED APPLICATIONS

This application is a continuation of and claims priority in U.S. patent application Ser. No. 14/094,417, filed Dec. 2, 2013, now U.S. Pat. No. 9,458,711, issued Oct. 4, 2016, which claims priority in U.S. Patent Application Ser. No. 61/731,898, filed Nov. 30, 2012, and is related to Ser. No. 14/215,617 for Network Telemetry System and Method and Ser. No. 14/217,160 for Robust Telemetry Repeater Network System and Method, all of which are incorporated herein by reference.

BACKGROUND OF THE INVENTION

1. Field of the Invention

The present invention relates generally to telemetry apparatuses and methods, and more particularly to acoustic telemetry relay network timing for exploration, completion and production wells for hydrocarbons and other resources, and for other telemetry applications.

2. Description of the Related Art

Acoustic telemetry is a method of communication used in the well drilling, completion and production industries. In a typical drilling environment, acoustic extensional carrier waves from an acoustic telemetry device are modulated in order to carry information via the drillpipe as the transmission medium to the surface. Upon arrival at the surface, the waves are detected, decoded and displayed in order that drillers, geologists and others helping steer or control the well are provided with drilling and formation data. In production wells, downhole information can similarly be transmitted via the well casings. Acoustic telemetry transmits data to the surface in real-time and is independent of fluid flow, depth, well trajectory and other drilling parameters.

The theory of acoustic telemetry as applied to communication along drillstrings and well casings has a long history, and a comprehensive theoretical understanding has generally been backed up by accurate measurements. It is now generally recognized that the nearly regular periodic structure of drillpipe and well casings imposes a passband/stopband structure on the frequency response, similar to that of a comb filter. Dispersion, phase non-linearity and frequency-dependent attenuation make drillpipe a challenging medium for telemetry, the situation being made even more challenging by the significant surface and downhole noise generally experienced.

When exploring for oil or gas, in coal mine drilling and in other drilling applications, an acoustic transmitter is preferentially placed near the BHA, typically near the drill bit where the transmitter can gather certain drilling and geological formation data, process this data, and then convert the data into a signal to be transmitted up-hole to an appropriate receiving and decoding node. In some systems, the transmitter is designed to produce elastic extensional stress waves that propagate through the drillstring to the surface, where the waves are detected by sensors, such as accelerometers, attached to the drill string or associated drilling rig equipment. These waves carry information of value to the drillers and others who are responsible for steering the well. Examples of such systems and their components are shown in: Drumheller U.S. Pat. No. 5,128, 901 for Acoustic Data Transmission through a Drillstring; Drumheller U.S. Pat. No. 6,791,470 for Reducing Injection Loss in Drill Strings; Camwell et al. U.S. Pat. No. 7,928,861 for Telemetry Wave Detection Apparatus and Method; and Camwell et al. U.S. Pat. No. 8,115,651 for Drill String Telemetry Methods and Apparatus. These patents are incorporated herein by reference.

Acoustic communication through drilling and production strings (collectively "drillstrings") is generally limited by available frequency spectra and signal attenuation. Consequently, transmission data rates tend to be relatively low, e.g., in the range of tens of bits per second, and multiple repeater nodes have previously been used to boost the telemetry signals and overcome the problem of acoustic signal attenuation and associated range limitations. The inclusion of multiple acoustic transceiver nodes within a drillstring forms a low rate linear repeater data network. As used herein "nodes" are defined as receivers (Rx), transmitters or transceivers (Tx) for telemetry signals traveling between adjacent pairs of nodes. Alternatively, the nodes could be associated with and referred to as "stations" (e.g., ST0, ST1, . . . STn) located along the drillstring. The low data rate linear repeater networks suffer from high latency (time for data to propagate through the network) due to the time it takes for each node to receive data packets and relay data onward. An objective of repeater networks is to relay data as quickly as possible after initial receipt, in order to minimize latency of data delivered to the surface (or other destination) and to maximize data throughput.

The latency of delivered measurement data translates into a potentially large time difference between the time at which a downhole sensor measurement is made and when that value is delivered to the surface, obscuring potentially valuable correlation between downhole and uphole events. Additionally, as sensor acquisition at each node within the network occurs at different points in time, the accuracy of inter-node differential measurements is limited, impairing the ability to discern transient events traversing the string.

A possible solution to drillstring acoustic communication latency-associated problems is to include time-of-measurement information with transmitted information from each node. However, bandwidth limitations make the inclusion of time-of-measurement (e.g., sensor acquisition time) information overhead in the acoustic packets undesirable, and require all downhole clocks to be very accurately aligned, which can be problematic given the significant temperature differentials across the networks (e.g., 150° C. or more) and the long periods of continuous network operation.

SUMMARY OF THE INVENTION

In the practice of the present invention, a repeater network is provided with highly controlled and predictable timing. This is achieved by reconfiguring the network with constants, which are known to all nodes: guard time, allocated time between receipt and transmission (relay), thus allowing for processing time, acquisition of sensor data and subsiding of channel delay spread (echoes, e.g., 0.5-5 seconds); and data packet transmission time, a function of the internode data rate and the packet bit length (for example, a 100-bit packet transmitted at a 20 bits-per-second (bps) link rate would have a data packet transmission time of 5 seconds). The sensor acquisition time is typically negligible, and is determined by the time between the acquisition of a measurement from a sensor to transmission of the corresponding data through the telemetry network. Based on the network time constants, a surface time-of-measurement for the relative timing offsets of all relay transmissions within the network can be computed from variables including: the packet received times, packet types, and guard and sensor acquisition times. Propagation delays can either be neglected or included in the time-of-measurement computation based on node separations and depth from surface, i.e., node depths. The advantages of the repeater network timing control include, without limitation:

No costly overhead associated with time-of-measurement within acoustic packets.

No network synchronization signal is required.

Variable inter-node propagation delays do not impact.

Agility, timing can change from frame-to-frame (packet type-to-packet type).

Other objects and advantages of the present invention will be apparent from the following description. Detailed descriptions of exemplary embodiments are provided in the following sections. However, the invention is not limited to such embodiments.

DETAILED DESCRIPTION OF THE PREFERRED EMBODIMENTS

In the following description, reference is made to "up" and "down" waves, but this is merely for convenience and clarity. It is to be understood that the present invention is not to be limited in this manner to conceptually simple applications in acoustic communication from the downhole end of the drillstring to the surface. It will be readily apparent to one skilled in the art that the present invention applies equally, for example, to subsurface nodes, such as would be found in telemetry repeaters.

I. Drilling Rig, Drillstring and Well Environment

Figure 1:
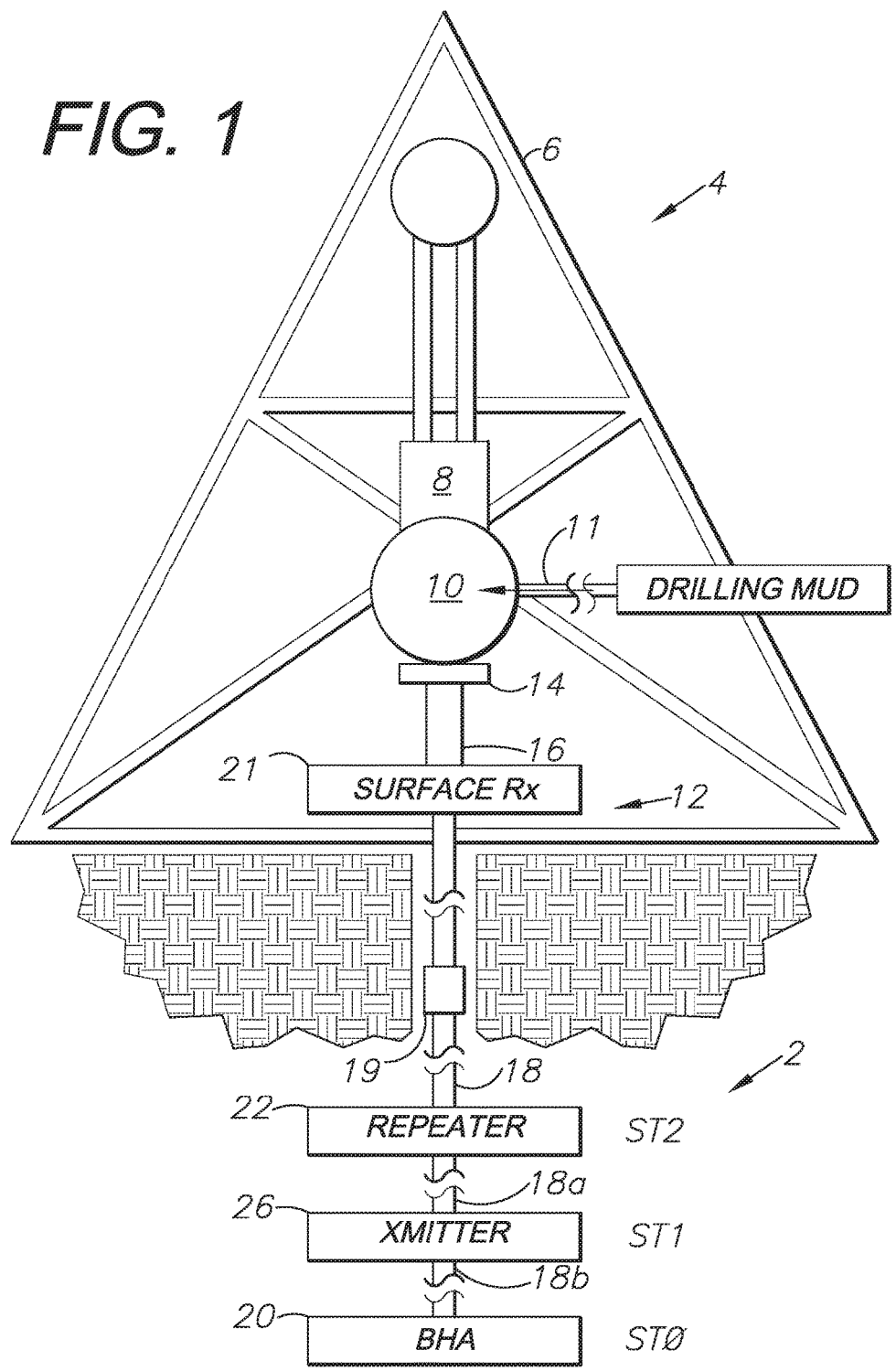
FIG. 1 is a diagram of a typical drilling rig, including an acoustic telemetry system, which can be provided with a downhole linear repeater relay network timing system embodying an aspect of the present invention.

Referring to the drawings in more detail, the reference numeral 2 generally designates a downhole low rate linear repeater relay network timing or control system embodying an aspect of the present invention. Without limitation on the generality of useful applications of the system 2, an exemplary application is in a drilling rig 4 (FIG. 1). For example, the rig 4 can include a derrick 6 suspending a traveling block 8 mounting a kelly swivel 10, which receives drilling mud via a kelly hose 11 for pumping downhole into a drillstring 12. The drillstring 12 is rotated by a kelly spinner 14 connected to a kelly pipe 16, which in turn connects to multiple drill pipe sections 18, which are interconnected by tool joints 19, thus forming a drillstring of considerable length, e.g., several kilometers, which can be guided downwardly and/or laterally using well-known techniques.

The drillstring 12 terminates at a bottom-hole assembly (BHA) 20 at acoustic transceiver node (ST0). Other rig configurations can likewise employ the present invention, including top-drive, coiled tubing, etc. Moreover, additional applications include completion rigs, completion strings, casing strings, gravel packs, frac packs and other applications. Without limitation on the generality of useful applications of the present invention, acoustic telemetry systems in general can utilize the repeater network timing control system and method of the present invention. FIG. 1 also shows the components of the drillstring 12 just above the BHA 20, which can include, without limitation, a repeater transceiver node 26 ST1 and an additional repeater transceiver node 22, ST2. An upper, adjacent drillpipe section 18a is connected to the repeater 22 and the transmitter 26. A downhole adjacent drillpipe section 18b is connected to the transmitter 26 and the BHA 20. A surface receiver (node) 21 can be provided at or near the upper end of the drillstring 12.

Figure 2:
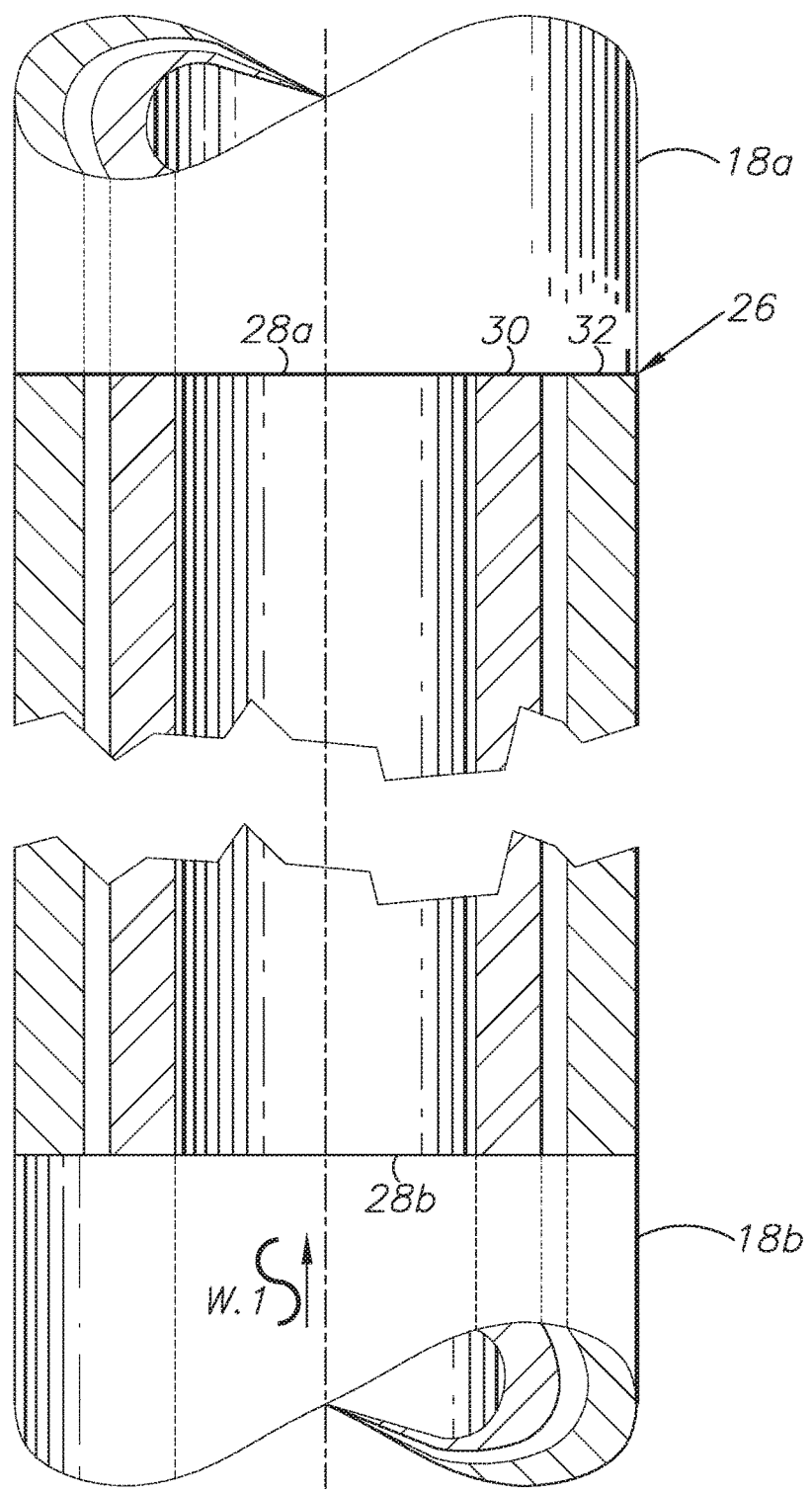
FIG. 2 is a fragmentary, side-elevational and cross-sectional view of a typical drillstring, which can provide the medium for acoustic telemetry transmissions for relaying, repeating and timing with the present invention.

FIG. 2 shows the internal construction of the drillstring 12, e.g., an inner drillpipe 30 within an outer casing 32. Interfaces 28a, 28b are provided for connecting drillpipe sections to each other and to the other drillpipe components, as described above. W.1 illustrates an acoustic, electromagnetic or other energy waveform transmitted along the drillstring 12, either upwardly or downwardly. The drillstring 12 can include multiple additional repeaters 22 at intervals determined by operating parameters such as optimizing signal transmissions with minimal delays and errors. The drillstring 12 can also include multiple sensors along its length for producing output signals corresponding to various downhole conditions.

II. Acoustic Network: Operation

Figure 3:
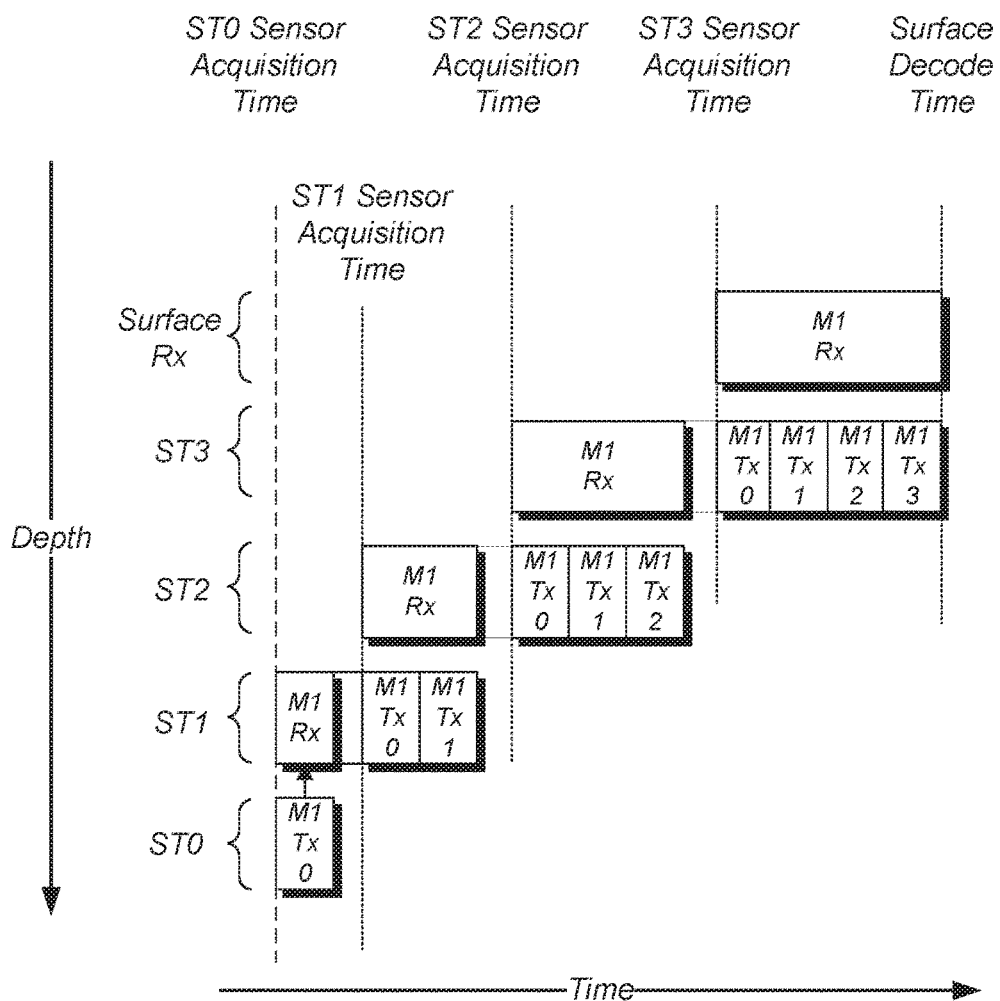
FIG. 3 is a schematic diagram of the repeater relay network timing system of the present invention, particularly showing accurate surface time-of-measurement.

FIG. 3 shows the operation of a downhole low rate linear repeater acoustic network timing control system. Other applications of the present invention include electromagnetic signal telemetry systems and systems transmitting signals through other media, such as drilling mud, ground, water, air, etc.

Telemetry data packets contain sensor or tool status data and are transmitted from the primary node (ST0, typically the deepest node) and relayed from node-to-node to the surface receiver 21 (Surface Rx), which is generally located at or near the wellhead. The telemetry data packets include sensor measurements from the BHA 20 and other sensors along the drillstring 12. Such data packet sensor measurements can include, without limitation, wellbore conditions (e.g., annular/bore/differential pressure, fluid flow, vibration, rotation, etc.). Local sensor data can be added to the data packet being relayed at each sensor node, thus providing along-string-measurements (ASMs).

A single node functions as the master node (e.g., ST0) and is typically an edge node at the top or bottom of the drillstring 12. The master node monitors well conditions and sends data packets of varying types and intervals accordingly. In addition to the long transmission/reception times associated with low data rate links, the asynchronous nature of wellbore variation tends to cause latency in an ASM operating mode because data-receiving nodes must await incoming packets before determining what sensor measurements must be acquired for inclusion in the packets being relayed. Such latency in a low-throughput repeater network translates into a potentially large time difference between the point when a downhole sensor measurement is made and when that value is delivered to the surface. Although including time-of-measurement (i.e., telemetry signal receive time) information within each acoustic packet with measurement data delivered to the surface can partly address this problem, additional problems can arise based on prohibitively large bandwidth requirements necessitated by the network low data rates, and the necessity of highly accurate alignment (synchronization) of downhole and surface clocks, which can be problematic due to relatively wide temperature differentials across the network (e.g., 150° C.+), and long periods of network operation.

III. Acoustic Network: Relay Timing and Control

According to the system and method of the present invention, all time constraints are controlled based on pre-configured constants, which are input to all nodes. The pre-configured constants can include:

Guard Times: time allocated between receipt and transmission (relay) to allow for processing time, acquisition of sensor data and channel delay spread (echoes) subsiding. Typically about 0.5 to 5.0 seconds.

Packet Transmission Time: a function of the internode data rate and packet bit length. For example, transmitting 100 bits @ 20 bps link rate=5 seconds.

Sensor Acquisition Time: time between the acquisition and measurement from a sensor to transmission of data through the telemetry network. Typically negligible, e.g. about 5-100 ms.

With all time controlled within such a frame, the surface receiver can calculate the relative timing offsets of all relay transmissions within the network based on the telemetry signal received time (e.g., time-of-measurement) of any packet and its type. With the additional information of sensor acquisition time, an exact time of sensor measurement can be calculated from the received time and used as an accurate time-of-measurement as follows:

N: Decoded Packet STID
o: Originating Station ID
Packet Time: # payload bits/(link bit rate)

$$\text{Time of measurement} = \text{Surface } DecodeTime[N] - \sum_{n=o}^{N} \text{Packet Time}[n] - \text{Guard Time} \times (N - o) - Ac \text{ Time}[o]$$

Figure 4:
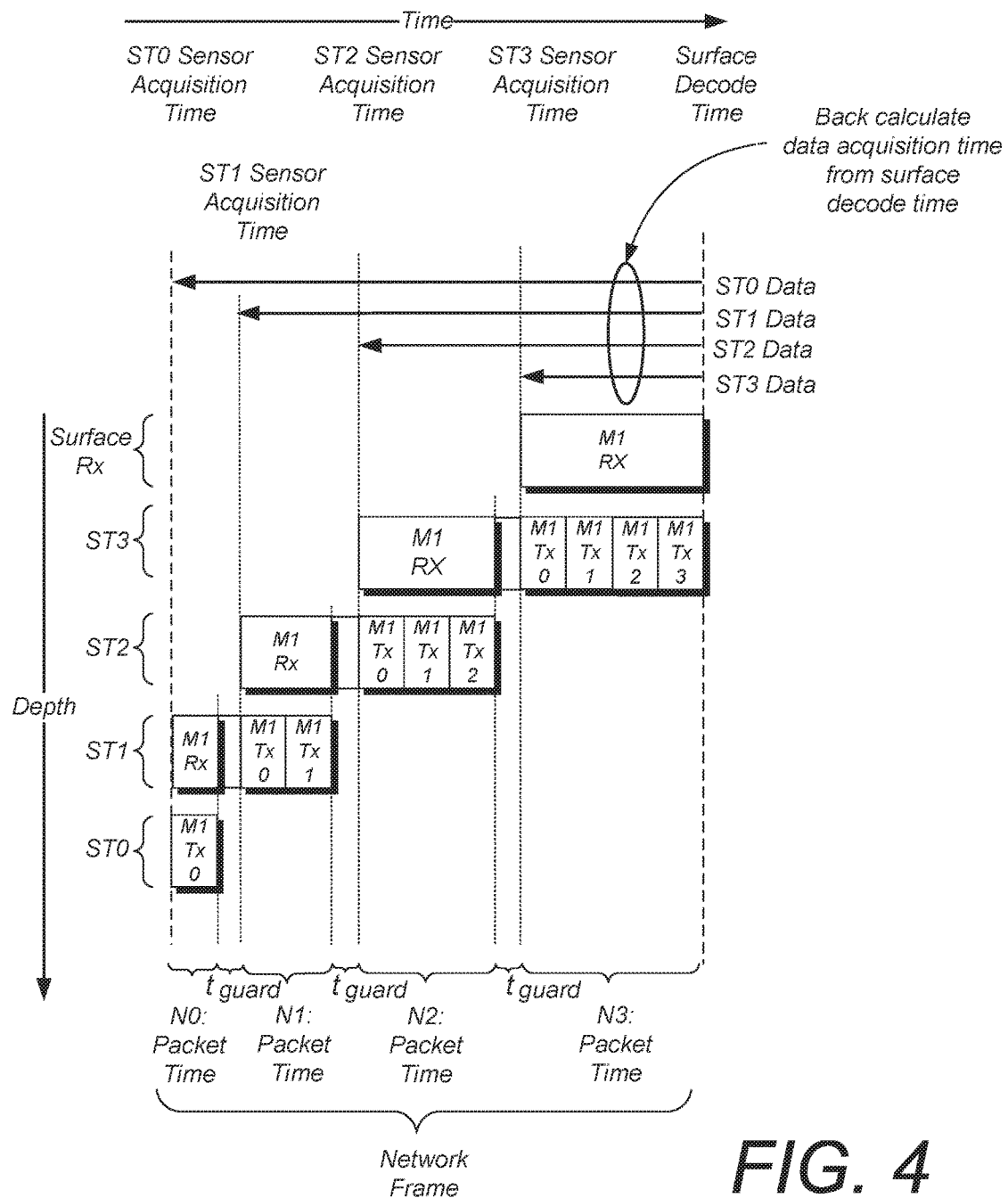
FIG. 4 is another schematic diagram of the repeater relay network timing system, particularly showing how a surface decode time-of-receipt of telemetry signal can be related back to the sensor acquisition time of any network node.
Figure 5:
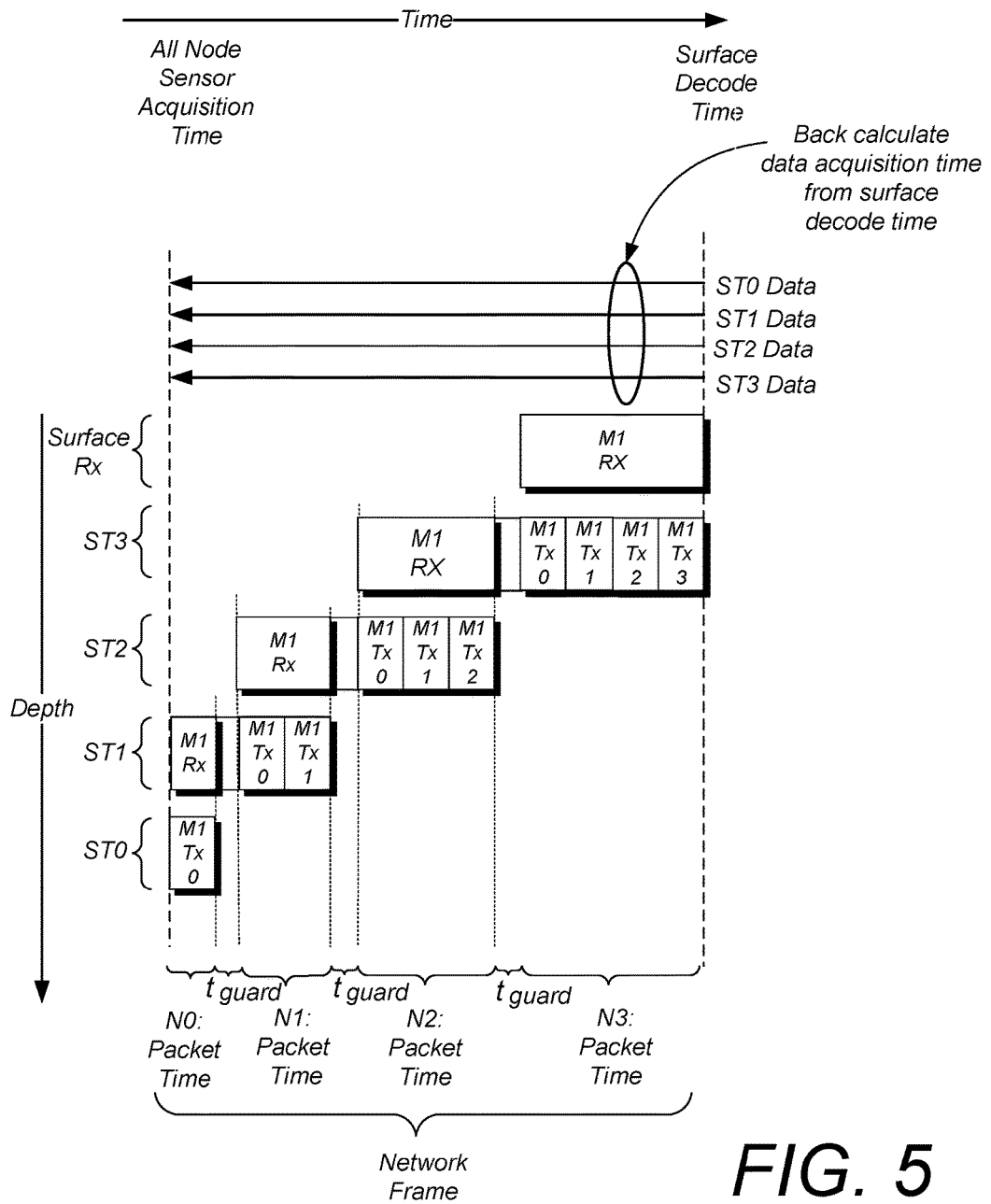
FIG. 5 is another schematic diagram of the repeater relay network timing system, particularly showing how a surface decode time-of-receipt of telemetry signal of a packet containing synchronized data is related to synchronized sensor acquisition across the network.

Wave propagation delays tend to minor relative to the above delays, and can be neglected, or can be easily accounted for with an additional subtraction based on originating node separation from the surface and group velocity of the packet signal (i.e. propagation delay=node depth× group velocity). In this way, a surface decode time-of-measurement can be related back to the signal receive time of any network node, as shown in FIGS. 4 and 5.

In cases requiring quality differential measurements between nodes, all nodes must acquire sensor measurement data at the same point in time, and add the data to the appropriate relay packet such that the packet delivered to the surface contains time-synchronized sensor data acquisition. This can be accomplished with controlled network timing, if, based upon receipt time and type of a packet, all nodes can calculate the relative point in time at which the primary node (e.g. ST0, deepest node) acquired its measurement data, and acquire sensor data at that same point in time.

From the perspective of the receiver node(s), the primary node sensor acquisition point occurred in the past. Sensor acquisition must therefore occur regularly and be buffered such that past measurement values are accessible. Buffer capacity and sampling rate are determined by the greatest possible frame length of all configurable modes, and the required alignment accuracy in the data of the network synchronized measurement. At the surface, the packets that are configured with network synchronized payload data will have their times-of-measurement adjusted according to that of the primary node.

In the practice of the method of the present invention, all nodes acquire sensor measurement value at the same point in time as the primary node. All nodes have the same acquisition time. A surface decode time-of-receipt of telemetry signal can be related back to the sensor acquisition time of ST0, as shown in FIG. 5.

IV. Extensions and Additional Applications

Without limitation on the generality of useful applications of the present invention, the network timing control system and method described above can be extended and applied to a wide range of additional applications, including:

Applicable to electromagnetic pulse systems as well as acoustic.

Applicable to downlink, uplink and bi-directional networks.

The network synchronized sensor acquisition could be aligned with any node within the network, or any point in time within a frame.

It is to be understood that the invention can be embodied in various forms, and is not to be limited to the examples discussed above. The range of components and configurations which can be utilized in the practice of the present invention is virtually unlimited.

Having thus described the invention, what is claimed as new and desired to be secured by Letters Patent is:

1. A downhole low rate linear repeater network timing relay system for a drilling rig including a drillstring extending subsurface downhole from a surface to a subsurface drillstring lower end, which timing relay system includes:

multiple nodes located along said drillstring, at least one of said nodes including a sensor to measure a downhole condition, said nodes configured to transmit a signal comprising data, and said nodes being connected to said drillstring and configured for receiving and re-transmitting said signal to form a telemetry relay network;

said timing relay system being configured for controlling timing within a relay frame according to pre-configured constants known to all nodes including: guard times allocated between receipt and re-transmission, telemetry signal transmission time, and sensor acquisition time between acquisition of a measurement from a sensor to transmission of a corresponding telemetry signal;

said multiple nodes deriving their timing offsets relative to each other based on reception point-in-time of said signal;

said timing relay system being applied at the surface node and calculating relative timing offsets of all relay transmissions within the telemetry relay network based on reception point-in-time of any telemetry signal originating from any node; and said timing relay system being configured for calculating time of sensor measurement for any node from the telemetry signal reception point-in-time at any node for use as an accurate time-of-measurement.

2. The downhole low rate linear repeater network timing relay system according to claim 1, wherein:

one or more of said nodes deriving their timing offsets relative to each other based on said pre-configured constants, reception point-in-time of said signal, and signal propagation time between nodes as a function of physical node distance separation.

3. The downhole low rate linear repeater network timing relay system according to claim 1, which includes:

multiple nodes;

said downhole low rate linear repeater network timing relay system being configured for determining one or more node timing offsets relative to the other nodes based on: a time of receipt of a telemetry data packet originating from another node, type of packet received, and preconfigured network operation parameters; and using said node timing offsets to specify one or more of: future transmission points-in-time; expected reception points-in-time; transmission guard times; and node sensor acquisition points-in-time.

4. The downhole low rate linear repeater network timing relay system according to claim 3, which is configured for:

determining points-in-time for sensor measurement acquisition based on said node timing offsets and said preconfigured constants.

5. The downhole low rate linear repeater network timing relay system according to claim 1, wherein said telemetry relay network utilizes either acoustic signals or electromagnetic signals.

6. The downhole low rate linear repeater network timing relay system according to claim 1 applied to one or more of the group comprising: exploration wells, production wells, completion rigs, completion strings, casing strings, coiled tubing, gravel pack, and frac pack operations.

\* \* \* \* \*